Nov. 17, 1936.  V. H. ELLACOTT  2,060,930
MACHINE FOR MAKING AND APPLYING STAPLES
Filed Nov. 20, 1933   5 Sheets-Sheet 1

INVENTOR.
VICTOR H. ELLACOTT
BY Merchant Kilgore
ATTORNEYS.

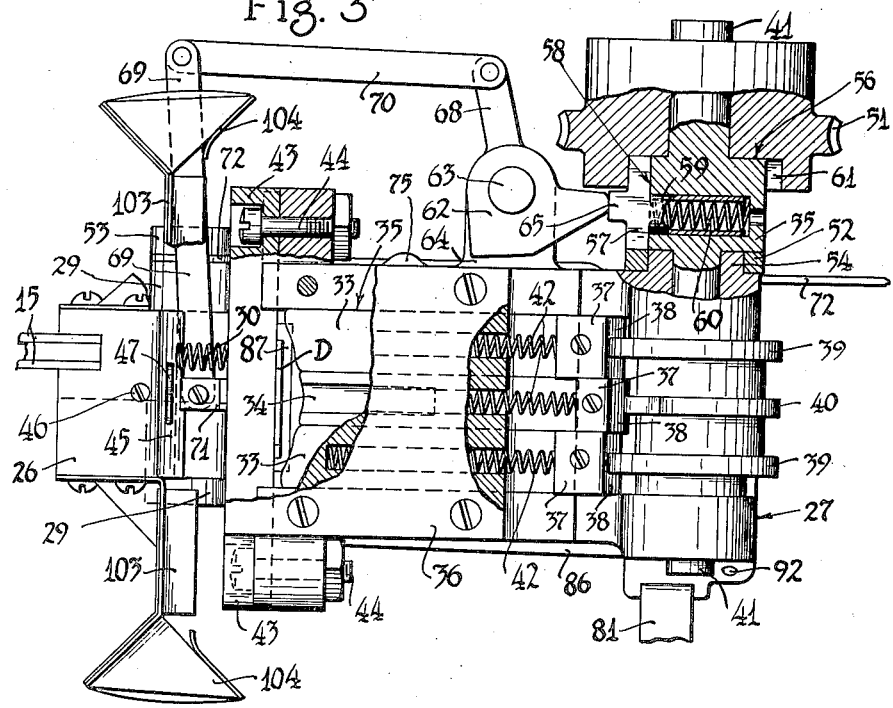
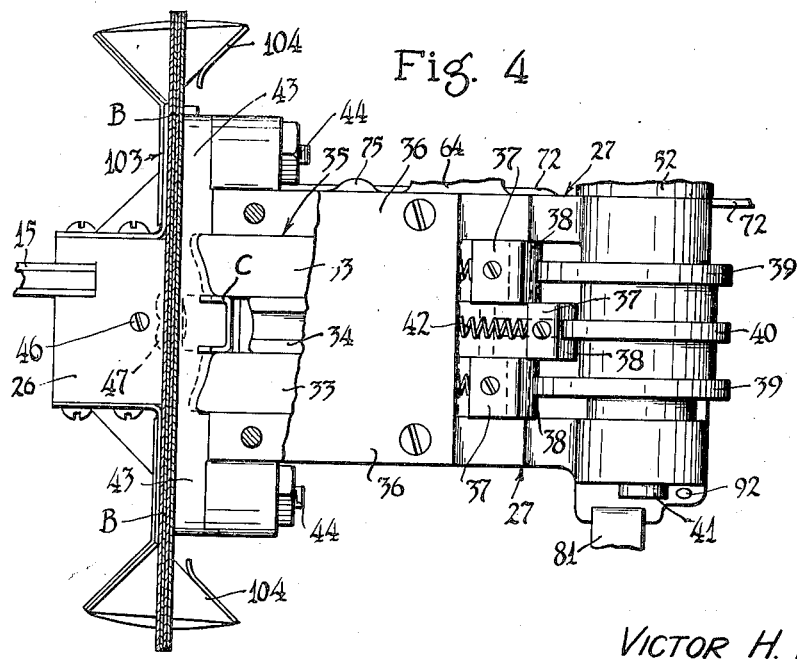

Nov. 17, 1936. V. H. ELLACOTT 2,060,930
MACHINE FOR MAKING AND APPLYING STAPLES
Filed Nov. 20, 1933 5 Sheets-Sheet 3

INVENTOR.
VICTOR H. ELLACOTT
BY
Merchant Kilgore
ATTORNEYS.

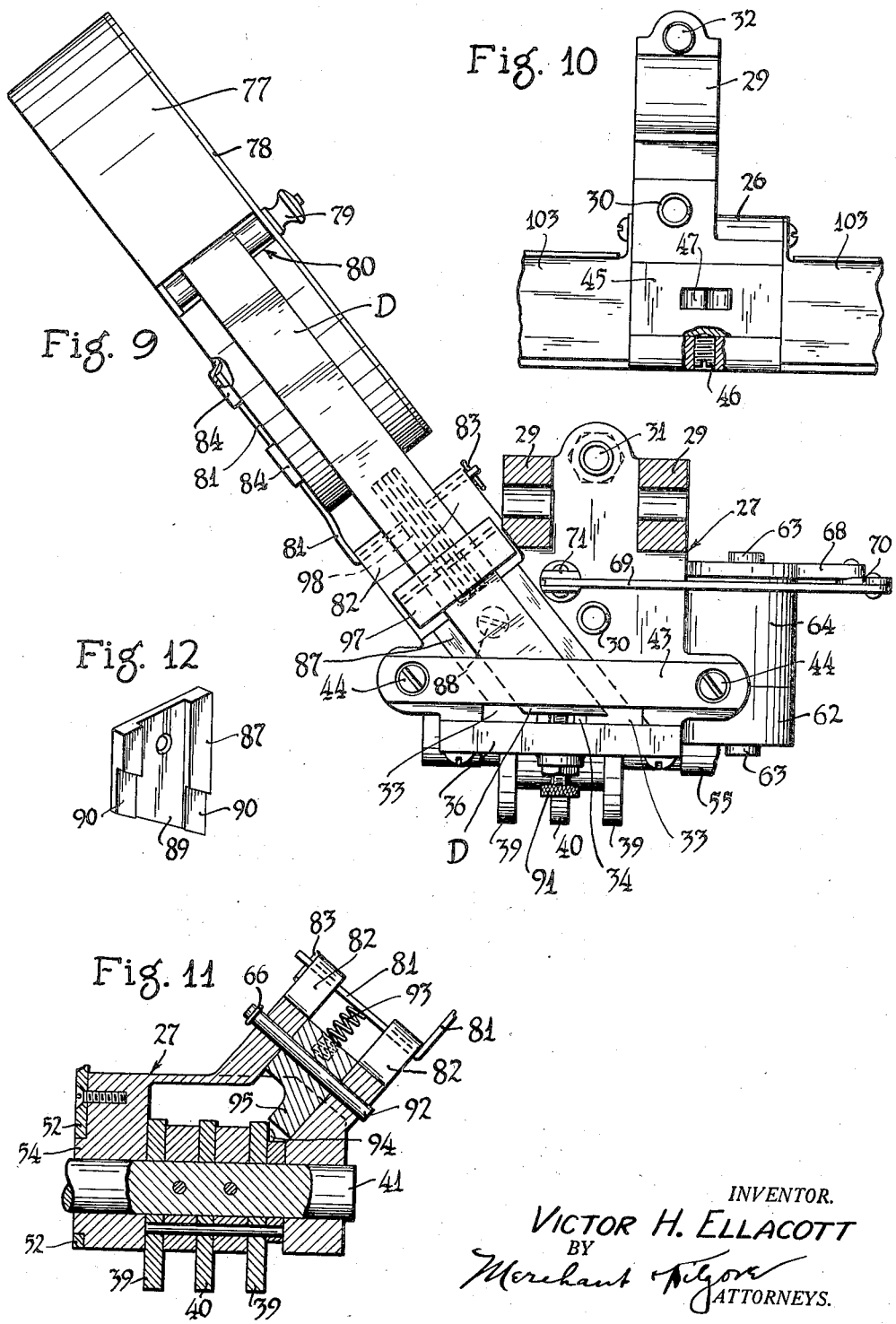

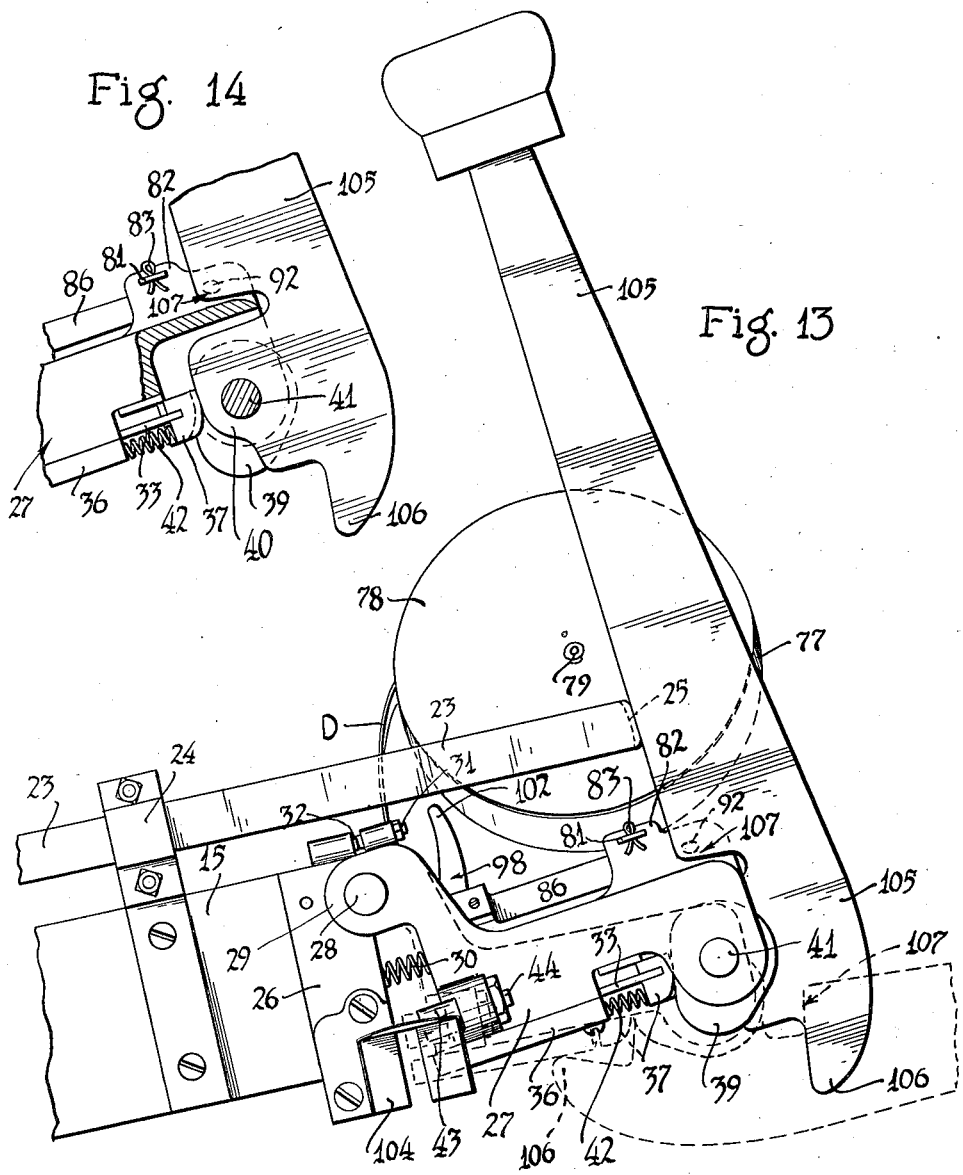

Patented Nov. 17, 1936

2,060,930

UNITED STATES PATENT OFFICE 2,060,930

MACHINE FOR MAKING AND APPLYING STAPLES

Victor H. Ellacott, Spring Valley, Minn.

Application November 20, 1933, Serial No. 698,809

22 Claims. (Cl. 1—2)

My present invention relates to a machine for making and applying staples and more particularly to such a machine of the type in which staples are made from a metal strip or tape and applied to bags, envelopes and the like for holding the same closed, and for use in the manufacture of berry boxes, cartons and the like and for securing covers to cartons after the same have been filled with merchandise.

The machine may be operated either by an electric motor or by hand and is also well adapted for use in applying shipping tags to objects, shades to rollers, window screens to frames, trim to automobile bodies and the like.

To the above end, generally stated, the invention consists of the novel devices and combinations of devices hereinafter described and defined in the claims.

In the accompanying drawings the machine illustrated is motor-driven and mounted on a counter for use in securing a bag closed, while supported on the counter, preferably after the upper portion thereof has been folded upon itself to form several plies.

Referring to the drawings:

Fig. 3 is a bottom plan view of the machine, as shown in Fig. 2, but on an enlarged scale, with some parts broken away and other parts sectioned;

Fig. 4 is a view corresponding to Fig. 3, but somewhat more fragmentarily illustrated, and showing the machine in a different adjustment, wherein a staple has been formed and is about to be driven through the plies of the folded upper portion of a paper bag, shown in section;

Fig. 9 is a view in rear elevation of the machine with its staple clinching base removed and with other parts sectioned on the line 9—9 of Fig. 1, on an enlarged scale;

Fig. 10 is a face view of the staple clinching base removed from the machine with some parts broken away and other parts sectioned;

Fig. 11 is a detail view principally in section taken on the irregular line 11—11 of Fig. 5, on an enlarged scale;

Fig. 12 is a perspective view of the chute tape guide removed from the machine;

Fig. 13 is a left side elevation of the machine designed for hand operation with some parts shown in different positions by means of broken lines; and Fig. 14 is a fragmentary detail view, partly in side elevation and partly in section, of the hand lever and associated parts.

Figure 1:
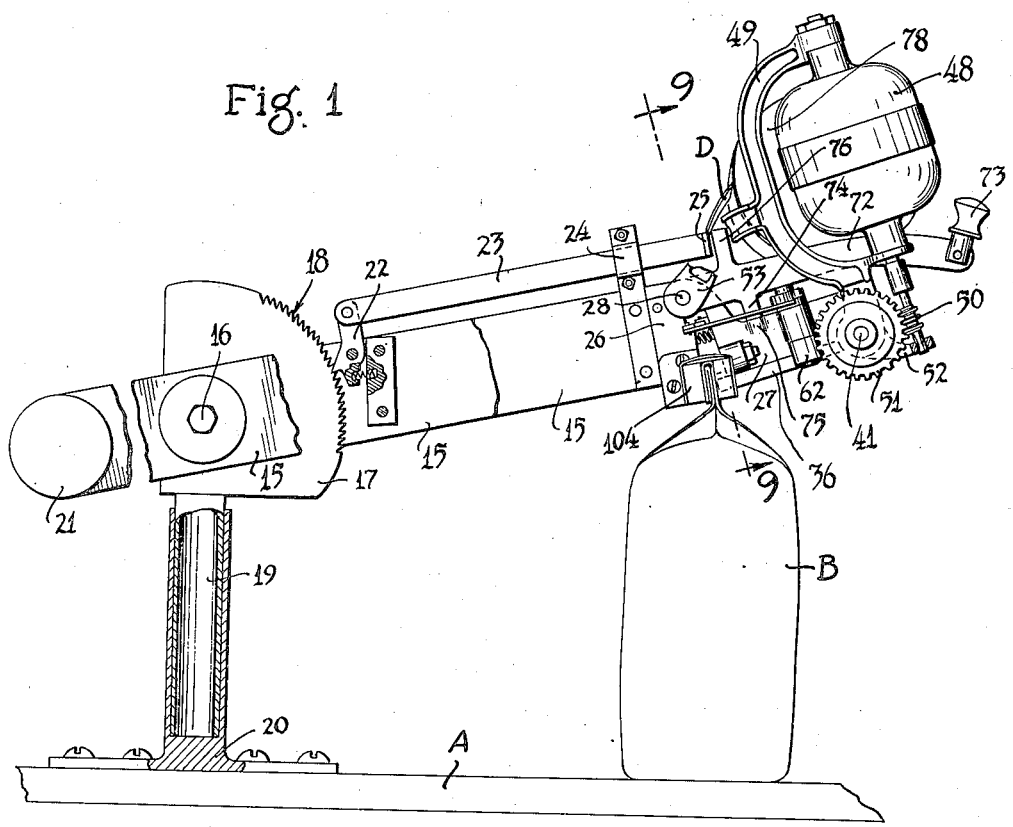
Fig. 1 is a left side elevation of the motor-driven machine, mounted on a counter or other support, with some parts broken away and other parts sectioned.
Figure 2:
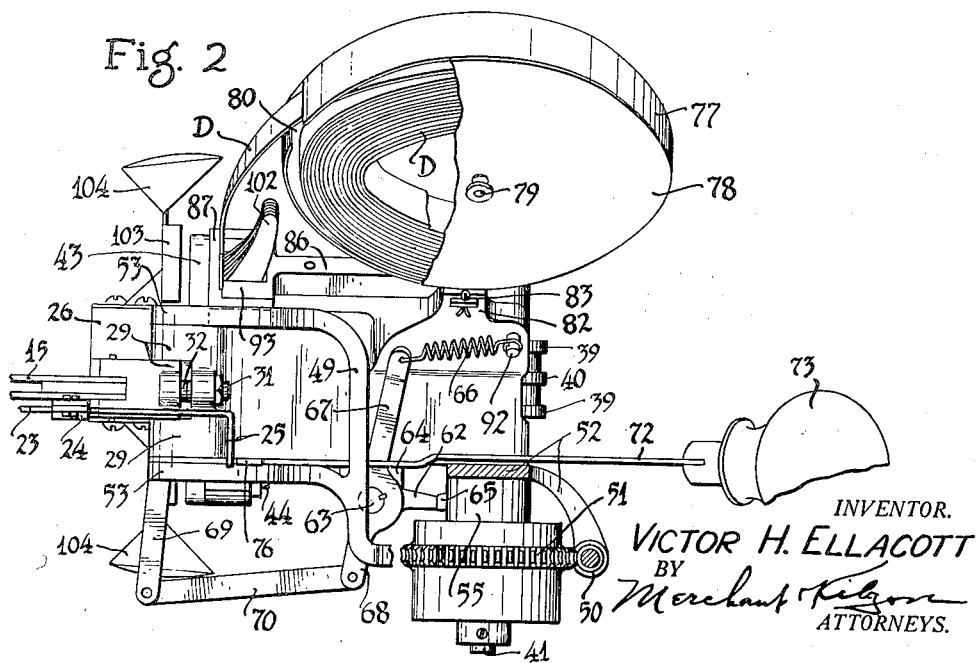
Fig. 2 is a view principally in plan with some parts broken away and other parts sectioned, on an enlarged scale.
Figure 5:
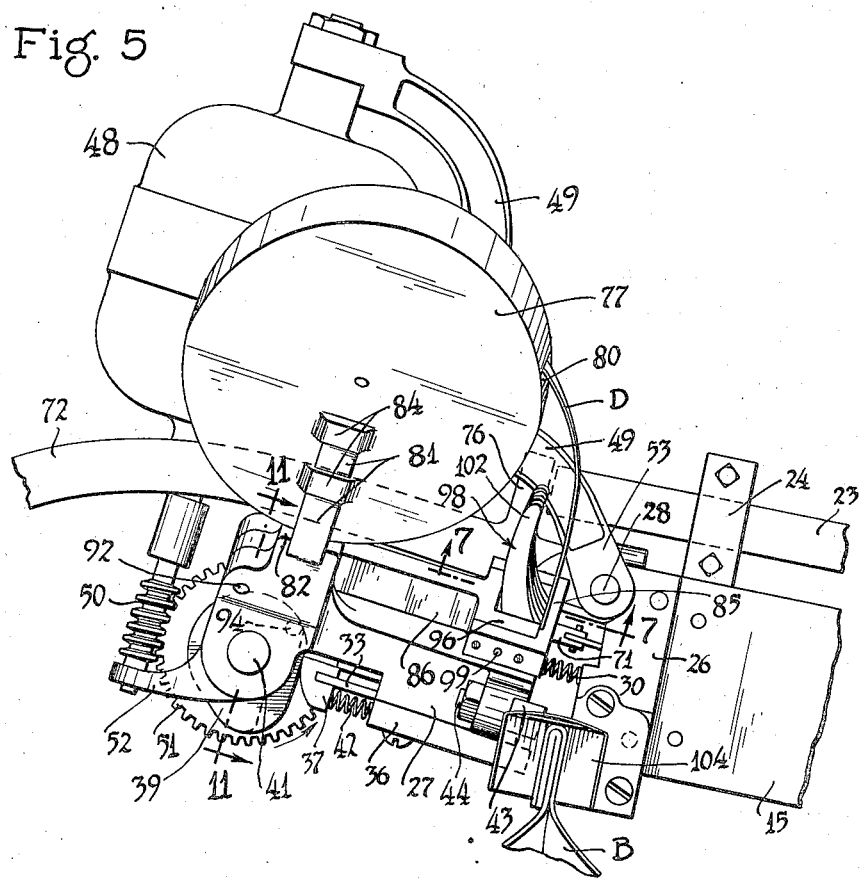
Fig. 5 is a right hand side elevation of the machine, as shown in Fig. 2, with some parts broken away.
Figure 6:
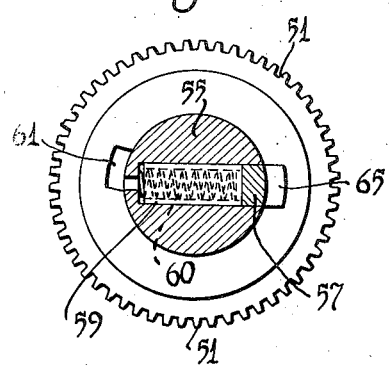
Fig. 6 is a view, partly in elevation and partly in section, of the worm wheel, its shaft and the clutch.
Figure 7:
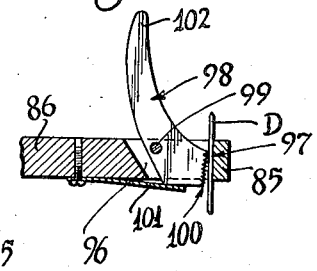
Fig. 7 is a fragmentary detail view with some parts sectioned on the line 7—7 of Fig. 5.
Figure 8:
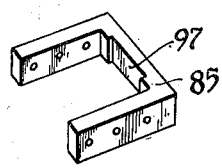
Fig. 8 is a perspective view of the tape guide removed from the feed arm.

Referring first to the invention shown in Figs. 1 to 12, inclusive, in which the machine is operated by an electric motor and mounted on a counter or other support A for raising or lowering movements and for bodily swinging movements about an axis perpendicular to said counter.

The machine proper or head assembly is mounted on the outer end of an elevating arm 15 intermediately pivoted at 16 to a segmental plate 17 having one-way ratchet teeth 18 on its periphery. This segmental plate 17 is rigidly secured to the upper end of a vertical stem 19 turnably mounted on a base 20 fixed to the counter A. The arm 15, as shown, comprises a pair of laterally spaced members between which the segmental plate 17 extends. On the opposite end of the arm 15 from the head assembly is the counterweight 21.

Co-operating with the ratchet teeth 18 is a spring-pressed dog 22 pivoted to and between the members of the arm 15 for holding said arm with the head assembly at the desired elevation above the counter A. An operating bar 23 for the dog 22 extends over the arm 15 substantially parallel thereto, is pivoted at its rear end to said dog and is held at its front end portion in a guide 24 on the arm 15 with freedom for endwise sliding movement. The front end portion of the operating bar 23 is bent laterally to afford a striking lug 25.

The head assembly includes a cast metal clinching base 26, rigidly secured to the free or outer end of the arm 15, and a cast body or frame 27 attached to said base by a hinge shaft 28 which extends through hinge lugs 29 on the tops of said base and body. The hinge shaft 28 supports the body 27 in a depending position for opening and closing movements relative to the base 26. When the body 27 is open the top of a bag B, when the sides thereof are pressed together and folded upon themselves to tightly close said bag, may be inserted longitudinally between the base 26 and the body 27 to receive a staple C. It may be here stated that during each cycle of operation of the machine a staple C is cut from a steel strip or tape D, formed, driven through the folded top of the bag B, and clinched as will hereinafter be described.

A coiled spring 30 normally holds the body 27 open and the end portions of said spring are mounted in recessed seats in the opposing faces of the base 26 and the body 27. Opening movement of the body 27, relative to the base 26, is limited and may be varied by a screw 31 in the body 27 and arranged to strike a steel insert 32 in the base 26 above the hinge shaft 28.

The staples C, see Fig. 4, are successively cut from the tape D by a pair of outer shearing and staple-forming cutters 33 and a center staple cutter and driver 34. The cutters 33—34 are each in the form of a rectangular bar and which cutters are mounted in a way 35 in the body 27 for independent endwise sliding movement in a plane that extends at right angles to the axis of the hinge shaft 28. The way 35 includes a displaceable housing plate 36. Said cutters 33—34, due to their shape, are held in the way 35 by the housing plate 36 and each other for straight line independent endwise sliding movement.

On the shank of each cutter 33—34 is a detachable head 37 held in place by a screw. The heads 37 have cam-engaging surfaces 38 that extend in a plane at right angles to the line of movement of the cutters 33—34. The cutters 33 are independently projected by a pair of outer cams 39 and the cutter 34 is independently projected by a central cam 40. These cams 39—40 are rigidly secured to a cam shaft 41 that extends at right angles to the plane of movement of the cutters 33—34 and is journaled in bearings on the body 27.

Coiled springs 42 independently hold the cutters 33—34 with the cam surfaces 38 in contact with the peripheries of the cams 39—40 and it is important to note that said cams extend at right angles from the plane of the cam-engaging surfaces 38. These springs 42 are compressed between the housing plate 36 and the heads 37 and are mounted at their end portions in recessed seats in said plate and heads.

Co-operating with the cutters 33—34 is a single shearing bar 43 that extends at right angles to the plane of said cutters and is detachably secured by bolts 44 to the body 27. The shearing bar 43 also acts as a base of resistance for the tape D during the shearing and forming of a staple C by the cutters 33—34.

A staple clinching block 45 is removably mounted in a recessed seat in the face of the base 26 directly in line with the cutters 33—34 and is held in place by a set-screw 46. Formed in the face of the clinching block 45 is a die 47 for upsetting the prongs of a staple C as the same is being driven by the cutter 34.

The cam shaft 41 is intermittently given one complete rotation by an electric motor 48 mounted on a motor support 49 and having on its armature shaft a worm 50 which meshes with a worm gear 51 loosely mounted on the cam shaft 41. The motor support 49 is at the left side of the head assembly and holds the motor 48 with its armature shaft vertically disposed but slightly tilted toward the rear of the machine. Said motor support 49 is rigidly secured to the body 27 by two arms 52 and 53, the former of which has at its outer end a hub mounted on a boss 54 on said body concentric with the cam shaft 41, see Fig. 3. The arm 53 is bifurcated, straddles the hinge lugs 29 and the members thereof have hubs at their outer ends mounted on the end portions of the hinge shaft 28.

A clutch is provided for releasably connecting the worm gear 51 to the cam shaft 41 and includes an annular body 55 formed with the cam shaft 41 between the body 27 and the worm gear 51 and is of a larger diameter than said shaft. The outer end portion of the body 55 extends into a recessed seat 56 in the inner face of the hub of the worm gear 51. Said clutch further includes a dog 57 in the form of a key mounted in a longitudinally extended key-way or seat 58 in the periphery of the body 55. Formed with the dog 57 at the bottom thereof and intermediate of its ends, is a tubular stem 59 which loosely works in a diametrically extended bore in the body 55.

A coiled spring 60 compressed between the dog 57 and the bottom of the bore for the stem 59 is under strain to project the dog 57 outwardly in its seat 58 and into a lock notch 61 in the worm gear 51. The depth of the lock notch 61 is less than the depth of the seat 58 so that the dog 57 is never entirely projected out of said seat.

A clutch latch 62 is provided for holding the clutch dog 57 inoperative when the body 27 is open. This clutch latch 62 is rigidly secured to a short heavy pivot pin 63 turnably mounted in a bearing lug 64 on the body 27. Said latch 62 is arranged to be engaged by a radially projecting trip lug 65 on the clutch dog 57 during the rotation of the cam shaft 41 and move said dog out of the lock notch 61 to release the clutch when the body 27 reopens. The clutch latch 62 is normally and yieldingly held in the path of movement of the trip lug 65 by a coiled spring 66 anchored at one end to the body 27 and attached at its other end to a radially projecting arm 67 rigidly secured to the pivot pin 63 on the opposite side of the bearing lug 64 from said latch.

During the closing movement of the body 27 the clutch latch 62 is automatically moved out of the path of movement of the trip lug 65 by a pair of arms 68 and 69 pivotally connected at their outer ends by a link 70. The arm 68 is fixed to the same hub as the arm 67 but diametrically opposite the same and the arm 69 is pivoted to a bearing lug 71 on the body 27 at the face thereof.

Normally the spring 66 holds the arm 69 obliquely against one edge of the base 26 which acts as a stop to position the clutch latch 62 in the path of movement of the trip lug 65. The closing movement of the body 27 causes the arm 69 to move on the base 26 as a fulcrum and thereby move the latch 62 out of the path of movement of the trip lug 65.

A hand lever 72 for use in either closing the body 27 or releasing the dog 22 is pivoted to the hinge shaft 28, extends forwardly over the body 27 and is provided at its free end with a knob 73. Formed with the lower end of the hand lever 72 is a depending lug 74 which normally and loosely rests on a boss 75 formed with the body 27 on the left hand side thereof. Obviously by pressing downwardly on the knob 73 the lever 72 will swing the body 27 on the hinge shaft 28 into a closed position against the tension of the spring 30. By lifting the lever 72, by means of the knob 73, an upstanding lug 76, formed with the upper edge of said lever, will engage the striking lug 25 and move the dog 22 out of engagement with the ratchet teeth 18 and thereby release the elevating arm 15 so that the head assembly may be raised or lowered.

The counterweight 21, which holds the machine substantially counterbalanced on the base 20, is highly important as it permits one hand control of the machine. Obviously, by holding the knob 73 in one hand the lever 72 may be used to swing the machine either to the left or the right about the axis of the stem 19 to release the dog 22 to raise or lower the machine about the axis of the pivot 16 and to swing the frame 27 into a closed position which, in turn, automatically sets the clutch.

The steel tape D is primarily in a coil which is loosely placed in an annular box 77 having a removable cover plate 78 held in place by a center screw stud and thumb-nut 79. The outer end portion of the tape D extends outwardly of the box 77 through a notch-like passageway 80 in the side thereof. An L-shaped bracket 81 supports the box 77 from and above the body 27 and in a position in which it is inclined outwardly from the left hand side of said box at an angle of substantially forty-five degrees. Said bracket 81 is detachably secured to the body 27 by having its base member inserted endwise through slit-like seats in a pair of laterally spaced upstanding lugs 82 on said body. The bracket 81 is held against removal from the body 27 by a cotter pin 83. The box 77 is removably attached to the upright member of the bracket 81, which extends radially therefrom, by being inserted endwise under a pair of loops 84 cut and pressed from the bottom of said box.

The outer end portion of the tape D extends through a removable guide 85 on a feed arm 86 and a guide chute 87 removably secured by a screw 88 to the body 27 at the face thereof. It is highly important to note that the guide 85 and guide chute 87 are in the plane of the box 77 so that when the tape D is fed to the machine the same is unwound from the coil in the box 77 without twisting.

The guide chute 87 is between the body 27 and the shearing bar 43 and has in its face a channel 89 for the tape D which is free for endwise movement therethrough. The width of the channel 89 is such as to hold the tape D against edgewise movement therein and the shearing bar 43 holds said tape against lateral movement in the channel 89 and also affords a base of resistance therefor during the shearing and forming of a staple C. The shearing of the tape D by the cutters 33—34 takes place at the inner and lower longitudinal edge of the shearing bar 43.

By reference to Fig. 12 it will be noted that the guide chute 87, at the sides of the channel 89, is notched, as indicated at 90, to receive the shearing bar 43 and thereby rigidly holds the guide chute 87 against angular movement relative thereto.

A lock-nut-equipped thumb-screw 91 having threaded engagement with the housing plate 36, from the underside thereof, affords a stop to limit the feeding movement of the tape D and determines the width of the staples C cut therefrom.

It is important to note that the end portion of the tape D in the guide chute 87 is in a plane perpendicular to the cutters 33—34 and the shearing bar 43 and the line of feed of said tape is in a plane oblique to the plane of said cutters and it is also oblique to the cutting edge of the shearing bar 43.

The feed arm 86 at one end extends between the lugs 82 below the bracket 81, is connected thereto by a pivot pin 92 and extends rearwardly therefrom substantially tangentially to the underside of the box 77 for oscillatory movement in the line of feed of the tape D. A coiled spring 93, between the top of the feed arm 86 and the base member of the bracket 81, is placed under strain to impart the operative or tape feeding stroke to said arm, as will hereinafter appear.

As heretofore stated, the feeding stroke of the feed arm 86 is imparted thereto by the spring 93 and the return stroke of said arm is imparted thereto by a lug-like tappet 94 on the outer face of one of the cams 39 and arranged to engage a radially projecting stub arm 95 on the hub of the feed arm 86 during the rotation of the cam shaft 41 and compress the spring 93.

The tape guide 85, which is U-shaped, is applied to the prongs 96 of the bifurcated free end of the feed arm 86 with its transverse portion extending between the prongs 96 and with its prongs outwardly overlapping said prongs 96 and detachably but rigidly secured thereto by screws. In the inner face of the transverse portion of the guide 85 is a shallow channel 97, see Figs. 5, 7, and 8, for the tape D.

It will be noted that the width of the channel 97 is less than the distance between the opposing faces of the prongs 96 so that the ends of said prongs overlap the longitudinal edge portions of the tape D and hold the same against lateral movement from said channel.

The purpose of removably securing the tape guide 85 and the tape guide chute 87 to the machine is that in actual usage of the machine different sets of these elements may be provided and interchangeably used for steel tapes of different widths and gauge, whereby staples of different widths and having legs of different lengths may be produced.

Between the prongs 96 is a plurality of feed dogs 98 mounted on a common pivot pin 99 for independent pivotal movement and which pin, at its ends, is anchored in said prongs. Each dog 98 has a plurality of teeth 100 arranged to engage the tape D at its back stroke and impart a step of movement thereto when the feed arm 86 is moved in the direction of the feed of said tape. A spring 101, on the underside of the feed arm 86, yieldingly holds the feed dogs 98 with their teeth pressed against the tape D. During the return stroke of the feed arm 86 by the atppet 94, the feed dogs 98 will slip over the tape D.

It may be here stated that during the return stroke of the feed arm 86 a staple C is being cut and formed by the cutters 33 and 34, and hence, the tape D is positively held thereby so that it can not be moved rearward by said arm during its return movement. The dogs 98 are provided with finger pieces 102 by which said dogs may be manually operated against the tension of the spring 101 to release the same from the tape D.

The purpose of providing a plurality of independently movable feed dogs 98 is to insure a more positive engagement between said dogs and the tape D and thus insure a more even feed for said tape. Furthermore, if the teeth 100 on one or more dogs 98 become dull, the other dogs will hold the tape D during the feeding thereof.

A guide 103 is provided for guiding the folded top of the bag B between the base 26 and the body 27 when said body is open. This guide 103 is in the form of an inverted channel made in two sections rigidly secured, one on each side of the base 26 with the inner face of the front flange flush and aligned with the face of the clinching block 45. The flanges at the end portions of the guide 103 are in flaring arrangement, as indicated by 104, to assist in directing the top of the bag B therein. By reference to Figs. 3 and 4 it will be noted that the rear flange of the guide 103 is substantially entirely cut away in order to permit the required movement of the shearing bar 43. The guide 103 also affords a finger guard to prevent a person from getting his fingers caught between the base 26 and body 27 during the operation of the machine. In actual construction a housing or casing, not shown, will be provided for the head assembly.

The object of feeding the tape D in a plane that is oblique to the plane of the cutters 33—34 and the cutting edge of the shearing bar 43 is so that the tape D will be cut transversely oblique and thereby form sharp points on the prongs of the staples.

Referring again to the relative arrangement of the cutters 33—34, the cams 39—40, the shearing bar 43 and the line of feed of the tape D, to the machine, it is highly important to note that the cams 39—40 are in a plane oblique to the line of feed of the tape D and that the cutters 33—34 are also in a plane that is oblique to said line of feed and perpendicular to the planes of the cams 39—40. This arrangement of the parts keeps proper right angle relation between the cutters 33—34 and the cams 39—40 that operate them.

The operation of the machine may be briefly described, as follows: A bag to be held closed by staples is first opened, placed on the counter A and filled with merchandise and thereafter the sides of the top of the bag are pressed together and folded one or more times upon themselves. In placing a bag on the counter A the same will be positioned so that when the head assembly is swung laterally the folded top of said bag will enter the guide 103. To adjust the head assembly to the proper elevation over the counter A to receive the folded top of a bag in the guide 103 the lever 72 is lifted by its knob 73 which rocks the lug 76 into engagement with the lug 25 and thereby moves the operating bar 23 endwise rearwardly and releases the dog 22. After the dog 22 has been released the arm 15 may be raised or lowered by means of the knob 73. Upon releasing the knob 73 the dog 22 will be spring-projected into engagement with one of the ratchet teeth 18 and thereby hold the arm 15.

After the folded top of a bag has been placed in the guide 103 and in proper position to receive a staple the operation of the machine is started by pressing downwardly on the knob 73 to close the body 27 against the tension of the spring 30 and at which time the lever 72 is held against pivotal movement by the engagement of its lug 74 with the boss 75 and said body. During the closing movement of the body 27 the arm 69, which is fulcrumed on one edge of the base 26, is operated by the movement of its pivotal connection 71 toward the base 26. This movement of the arm 69 swings the latch 62, through the connections heretofore described, out of the path of movement of the trip lug 65 and allows the clutch dog 57 to be projected by its spring 60 into the lock notch 61 and set the clutch which connects the cam shaft 41 to the worm gear 51 which is driven by the motor 48.

During the initial rotation of the cam shaft 41 the cams 39 project the cutters 33 which transversely shear the longitudinal edge portions of the tape D and thereafter bends the severed portions of the tape outwardly to form the prongs of the staple. Further rotary movement of the cam shaft 41 will cause the cam 40 to project the cutter 34 and sever the staple from the tape D. The cutters 33—34 while projected, to cut and form a staple from the strip D, hold said strip against backward movement under the action of the dogs 95 thereon while being carried by the feed arm 86 during the backward stroke of said arm imparted thereto by the tappet 94 acting on the stub arm 95 of said feed arm. This backward movement of the feed arm 86 compresses the spring 93 and places the same under sufficient tension to swing the feed arm 86 forward when released. By the time the tappet 94 has released the stub arm 95, and hence the feed arm 86, the cutters 33—34 have completely severed a staple from the strip D and have thereafter been retracted sufficiently to release the strip D held thereby. Upon the releasing of the strip D, the compressed spring becomes active and swings the feed arm 86 forward so that the dogs 95 carried thereby grip the strip D and move said strip forward and position the front end of the strip D against the screw 91.

At the completion of the severing of the staple from the tape D the cutter 34 drives the legs of the staple through the folded top of the bag and into engagement with the die 47 which clinches the same. Before the cam shaft 41 has made one complete rotation the operator releases the knob 73 and the compressed spring 30 opens the body 27 and at which time the spring 66 becomes active and positions the latch 62 in the path of movement of the trip lug 65 which presses the dog 57 out of the lock notch 61 and thereby releases the clutch. It will thus be seen that for each rotation of the cam shaft 41 a staple is formed and the folded top of the bag fastened thereby and the tape D given a step of movement from the cutting edge of the shearing bar 43 to the screw 91.

Referring now to the hand operated machine shown in Figs. 13 and 14, the parts illustrated have the same reference numerals as corresponding parts in the motor operated machine except a hand lever 105 by which the shaft 41 is rocked instead of being rotated as in the power machine. This hand lever 105 is formed with the cam 40 and extends radially from the shaft 41.

The hand lever 105, in addition to its use for operating the rock-shaft 41, serves another important function in that it may be operated, at will, to release the spring-held dog 22 and permit the elevating arm 15 to be raised or lowered. The movement of the hand lever 105 is in the same plane as that of the operating bar 23 and the extreme movement of said lever during its return stroke will engage the striking lug 25 and move the operating bar 23 rearwardly sufficiently to release the dog 22 against the tension of its spring which holds the same in an operative position.

On the pivoted end of the hand lever 105 is a stop finger 106 arranged to engage the housing plate 36 as a stop to limit the operative stroke of said lever and a stop shoulder 107 on said lever is arranged to engage the top of the body 27 and limit the return stroke of the hand lever 105.

What I claim is:

1. In a machine of the class described, a support, an arm mounted on the support for lateral swinging movement, and a machine for making and applying staples hingedly mounted on the arm, and a clinching block mounted on the arm for co-operation with the machine.

2. In a machine of the class described, a support, an arm pivoted to the support for raising or lowering movement, latch mechanism including a movable element normally holding the arm raised, and a machine for making and applying staples mounted on the arm.

3. The structure defined in claim 2 which further includes a hand lever on the machine by which the arm may be raised or lowered, and operating connections from said lever to the movable element of the latch mechanism.

4. The structure defined in claim 2 which further includes a counterweight on the arm which holds the machine substantially balanced.

5. In a machine of the class described, a support, an arm pivoted to the support for raising or lowering movement, latch mechanism including a movable element normally holding the arm raised, a clinching block on the arm, a frame hinged to the arm for relative opening or closing movement, said frame being normally held open, staple forming and driving mechanism mounted on the frame for cooperation in part with the clinching block, a hand lever on the machine by which the arm may be raised or lowered, and operating connections from the lever to the movable element of the latch mechanism, said lever being operable, at will, to either close the frame or actuate the operating connections.

6. In a machine of the class described, a support, an arm mounted on the support to turn about a vertical axis and for pivotal raising or lowering movement, latch mechanism including a movable element normally holding the arm raised, a clinching block on the arm, a frame hinged to the arm for relative opening or closing movement, said frame being normally held open, staple forming and driving mechanism mounted on the frame for cooperation in part with the clinching block, a hand lever on the machine by which the arm may be raised, lowered or swung laterally, and operating connections from the lever to the movable element of the latch mechanism, said lever being operable, at will, to either close the frame or actuate the operating connections.

7. The structure defined in claim 6 in which the arm is intermediately pivoted to the support, and which structure further includes a counterweight on the arm, said frame and counterweight being on opposite ends of the arm.

8. In a machine of the class described, a base having a post comprising two telescopically connected members, one of which is relatively fixed and the other of which is relatively turnable about the axis of the post, an arm pivoted to the turnable post member for raising or lowering movements, a ratchet tooth equipped segment on the movable post member and a cooperating pawl on the arm normally holding the arm raised, and a machine for making and applying staples mounted on the arm.

9. In a machine of the class described, a frame, staple forming and driving mechanism mounted on the frame, means for feeding a metal tape to said mechanism including an oscillatory arm and a plurality of laterally spaced dogs mounted on the arm for independent movement longitudinally of said tape and spring means independently holding each dog, said dogs being arranged to move the tape with the arm to feed the same to said mechanism during forward movement of the arm and to release said tape during rearward movement of the arm.

10. In a machine of the class described, a fixed base having a staple clinching block, a frame hinged to the base for opening or closing movement relative to the clinching block, said frame being normally held open, staple forming and driving mechanism mounted on the frame for cooperation in part with the clinching block, an electric motor, driving connections including a normally set clutch for intermittently operating said mechanism from the motor, and clutch operating connections arranged to be operated by the frame during its closing movement to release the clutch.

11. In a machine of the class described, a fixed base having a staple clinching block, a frame hinged to the base for opening or closing movement relative to the clinching block, said frame being normally held open, staple forming and driving mechanism mounted on the frame for co-operation in part with the clinching block, an electric motor, driving connections including a normally set clutch for intermittently operating the shaft from the motor, said clutch having a movable dog, a trip device normally and yieldingly held in position to release the clutch dog during rotation of the clutch, and operating connections for moving the trip device out of the path of movement of the clutch dog and arranged to be actuated by the frame during its closing movement.

12. In a machine of the class described, a fixed base having a staple clinching block, a frame hinged to the base for opening and closing movements relative to the clinching block, said frame being normally held open, staple forming and driving mechanism mounted on the frame for cooperation in part with the clinching block, an electric motor, driving connections including a normally set clutch for intermittently operating the shaft from the motor, said clutch having a movable dog, a pivoted latch having an arm and normally spring-held in the path of movement of the clutch dog for releasing the clutch during rotation thereof, an arm pivoted to the frame, and a link connecting the two arms, said lever being arranged to fulcrum on the base during closing movement of the frame and move the latch out of the path of movement of the clutch dog.

13. In a machine of the class described, a support, an arm pivoted to the support for raising or lowering movement, latch mechanism including a movable element normally holding the arm raised, a clinching block on the arm, a frame hinged to the arm for relative opening or closing movement, said frame being normally held open, staple forming and driving mechanism mounted on the frame including a plurality of sliding cutters and cams for independently operating the cutters, a hand lever for operating the cams, and operating connections from the hand lever to the movable element of the latch mechanism.

14. In a machine of the class described, a support, an arm mounted on the support for lateral swinging movement, a clinching block on the arm, a frame hinged to the arm for opening or closing movement relative to the clinching block, said frame being yieldingly held open, staple-forming and driving mechanism mounted on the frame for co-operation, in part, with the clinching block when the frame is closed, and manually operated means for closing the frame and for starting the operation of said mechanism.

15. In a machine of the class described, a support, an arm mounted on the support for lateral swinging movement, a clinching block on the arm, a frame hinged to the arm for opening or closing movement relative to the clinching block, said frame being yieldingly held open, staple-forming and driving mechanism mounted on the frame for co-operation, in part, with the clinching block when the frame is closed, and means including a pivoted hand lever for closing the frame and for starting the operation of said mechanism.

16. In a machine of the class described, a support, an arm mounted on the support for lateral swinging movement, a clinching block on the arm, a frame hinged to the arm for opening or closing movement relative to the clinching block, said frame being yieldingly held open, staple-forming and driving mechanism mounted on the frame for co-operation, in part, with the clinching block when the frame is closed, an electric motor mounted on the frame, driving connections from the motor for operating said mechanism including a normally released clutch, and connections actuated by the closing of the frame for setting the clutch.

17. The structure defined in claim 14 which further includes a combined stop and guide on the arm for positioning a piece of work relatively to the clinching block.

18. The structure defined in claim 14 which further includes a combined stop and guide on the arm extending on each side of the clinching block for positioning a piece of work relative to said block.

19. In a machine of the class described, a movable frame, staple-forming and driving mechanism, an electric motor mounted on the frame, driving connections from the motor to said mechanism including a normally released clutch, and connections for setting the clutch constructed and arranged to be set in motion when brought into contact with a relatively stationary support during movement of the frame toward said support.

20. In a machine of the class described, a movable frame, staple-forming and driving mechanism, an electric motor mounted on the frame, driving connections from the motor to said mechanism including a normally released clutch, and connections for setting the clutch constructed and arranged to be set in motion when brought into contact with a relatively stationary support during movement of the frame toward said support, and automatic means for releasing the clutch at the completion of the driving of a staple.

21. In a machine of the class described, a frame, staple-forming and driving mechanism mounted on the frame, means for feeding a metal tape to said mechanism including an oscillatory feed arm, the outer end of said arm being bifurcated, a feed dog mounted between the prongs of said arm, and a removable tape guide spanning the opening between the prongs on the arm and having a channel, the sides of which extend under the ends of said prongs.

22. In a machine of the class described, a frame, staple-forming and driving mechanism mounted on the frame, means for feeding a metal tape to said mechanism including an oscillatory feed arm, the outer end of said arm being bifurcated, a feed dog mounted between the prongs of said arm, and a U-shaped tape guide, the transverse portion of which spans the opening between the prongs on the arm and with its prongs overlapping the prongs on the arm and detachably secured thereto, said guide having a channel in its transverse portion with its sides under the ends of the prongs on the arm.

VICTOR H. ELLACOTT.